(12) United States Patent
Inukai et al.

(10) Patent No.: US 9,897,151 B2
(45) Date of Patent: Feb. 20, 2018

(54) ONE-WAY CLUTCH (71) Applicant: JTEKT CORPORATION, Osaka-shi, Osaka (JP)

(72) Inventors: Hiroshi Inukai, Nara (JP); Ikuo Yamamoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/373,015

(22) Filed: Dec. 8, 2016

(65) Prior Publication Data

US 2017/0175827 A1    Jun. 22, 2017

(30) Foreign Application Priority Data

Dec. 16, 2015    (JP) ................................ 2015-245204

(51) Int. Cl.
*F16D 41/067*    (2006.01)
*F16D 41/06*    (2006.01)

(52) U.S. Cl.
CPC .... *F16D 41/067* (2013.01); *F16D 2041/0605* (2013.01)

(58) Field of Classification Search
CPC ...... F16D 41/067; F16D 41/064; F16D 41/06; F16D 2014/0605
See application file for complete search history.

(56) References Cited

U.S. PATENT DOCUMENTS

| 3,718,212 | A | * | 2/1973 | Havranek | F16D 41/067 192/45.007 |
| 5,819,898 | A | * | 10/1998 | Stark | F16D 41/067 192/113.32 |
| 5,941,355 | A | * | 8/1999 | Iga | F16D 41/067 192/45.013 |
| 2001/0045334 | A1 | * | 11/2001 | Aida | F16H 55/36 192/45.017 |
| 2003/0141161 | A1 | * | 7/2003 | Ouchi | F16H 55/36 192/45.008 |
| 2004/0011618 | A1 | * | 1/2004 | Aida | F16H 55/36 192/45.007 |

(Continued)

FOREIGN PATENT DOCUMENTS

JP    2012-219845 A    11/2012
JP    2013-257024 A    12/2013

*Primary Examiner* — Huan Le
*Assistant Examiner* — Lori Wu
(74) *Attorney, Agent, or Firm* — Oliff PLC (57) ABSTRACT

A one-way clutch includes an inner ring, an outer ring, a plurality of rollers, an annular cage in which pockets are formed at intervals in a circumferential direction so that the rollers are held in the pockets, and springs attached to cage bars of the cage to bias the rollers. The cage has protruding portions fitted in the inner ring so that the cage is not allowed to rotate with respect to the inner ring. The inner ring has recessed portions each including a cam surface that allows a corresponding one of the engagement elements to be engaged between the cam surface and an inner peripheral surface of the outer ring. Each of the recessed portions further has a fitting surface that is formed as a surface continuous with the cam surface in the recessed portion and on which a corresponding one of the protruding portions is closely fitted.

6 Claims, 5 Drawing Sheets

(56) References Cited

U.S. PATENT DOCUMENTS

| | | | |
|---|---|---|---|
| 2004/0211063 A1* | 10/2004 | Aida .................. | F16D 41/067 29/892.1 |
| 2004/0216974 A1* | 11/2004 | Aida .................. | F16D 41/064 192/45.008 |
| 2005/0050983 A1* | 3/2005 | Wehr .................. | F16D 41/067 384/416 |
| 2007/0119676 A1* | 5/2007 | Altmann ............... | F16D 41/067 192/45.008 |
| 2015/0147014 A1* | 5/2015 | Chambonneau ...... | F16D 41/067 384/576 |
| 2016/0010705 A1* | 1/2016 | Mori .................. | F16D 41/067 192/45.006 |

* cited by examiner

ONE-WAY CLUTCH

INCORPORATION BY REFERENCE

The disclosure of Japanese Patent Application No. 2015-245204 filed on Dec. 16, 2015 including the specification, drawings and abstract, is incorporated herein by reference in its entirety.

BACKGROUND OF THE INVENTION

1. Field of the Invention

The invention relates to a one-way clutch.

2. Description of the Related Art

Figure 5:
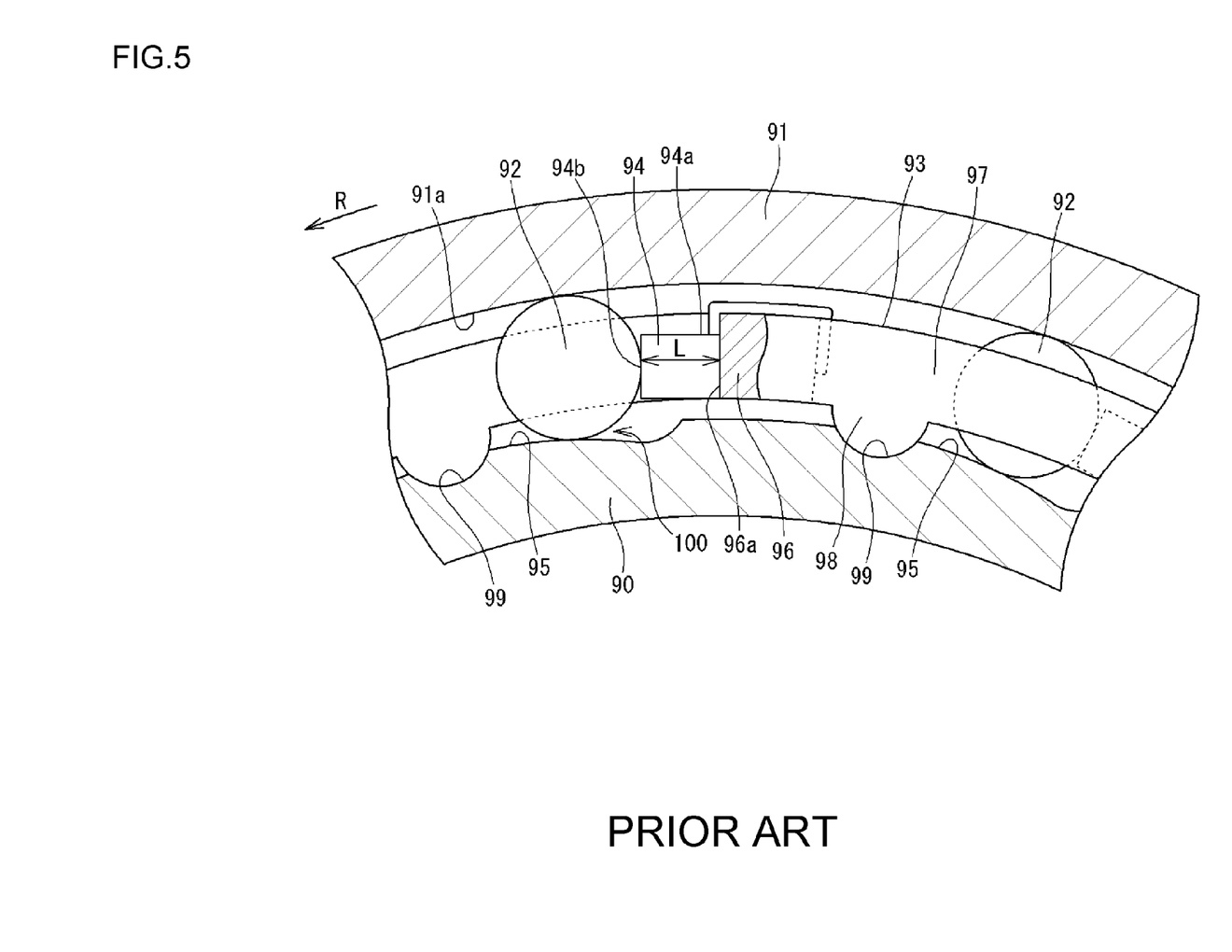
FIG. 5 is a diagram illustrating a conventional one-way clutch.

A one-way clutch is used for various types of equipment (see, for example, Japanese Patent Application Publication No. 2013-257024 (JP 2013-257024 A)), by way of example, for an alternator in an automobile. A one-way clutch typically includes an inner ring 90, an outer ring 91, a plurality of rollers (engagement elements) 92, an annular cage 93, and springs 94, as shown in FIG. 5. The rollers are provided between the inner ring 90 and the outer ring 91. The cage 93 holds the rollers 92. The springs 94 bias the rollers 92. On an outer periphery of the inner ring 90, a plurality of cam surfaces 95 shaped like recesses is formed at regular intervals. A wedge-like space 100 is formed between each of the cam surfaces 95 and an inner peripheral surface 91a of the outer ring 91. One roller 92 is provided in each of the wedge-like spaces 100. A one-way clutch for an alternator is configured such that the outer ring 91 rotates integrally with a pulley. In FIG. 5, a rotating direction of the outer ring 91 is depicted by arrow R.

In the one-way clutch, when the rotational speed of the outer ring 91 is higher than the rotational speed of the inner ring 90 and the outer ring 91 rotates relative to the inner ring 90, each of the rollers 92 is engaged between the corresponding cam surface 95 and the outer ring 91. This makes the inner ring 90 and the outer ring 91 unable to rotate relative to each other. When the rotational speed of the outer ring 91 is lower than the rotational speed of the inner ring 90, the rollers 92 are disengaged from the inner ring 90 and the outer ring 91. This makes the inner ring 90 and the outer ring 91 rotatable relative to each other.

To allow the one-way clutch to function as described above, each roller 92 needs to be stably engaged between the corresponding cam surface 95 and the outer ring 91. Thus, the one-way clutch is configured such that, in each of the wedge-like spaces 100, the corresponding spring 94 pushes, with a predetermined force (elastic force), the corresponding roller 92 in a direction in which the wedge-like space 100 is narrowed.

An important factor that allows the spring 94 to push the roller 92 with the predetermined force is a circumferential positional relationship between each roller 92 (the cam surface 95 with which the roller 92 engages) and a corresponding one of cage bars 96 of the cage 93 to which the corresponding spring 94 is attached. In other words, when the distance (in other words, the interval) between each roller 92 (cam surface 95) and the corresponding cage bar 96 to which the corresponding spring 94 is attached significantly varies among the plurality of wedge-like spaces 100, a heavier load is imposed on some of the springs 94. As a result, these springs 94 fatigue, possibly shortening the life of the one-way clutch. A "spring area" as used herein refers to an area between each cage bar 96 and the corresponding roller 92 where the corresponding spring 94 is provided.

That is, a significant variation in the distance of the spring area (circumferential dimension) among the wedge-like spaces 100 causes a distance L between each roller 92 and a corresponding spring attachment portion 96a on the cage 93 (a side surface of the cage bar 96) to vary among the wedge-like spaces 100. Thus, in order to allow each spring 94 to push the corresponding roller 92 with the minimum needed force, the shape (length) of the spring 94 needs to be set, for all the spring areas, with reference to the case where the distance L is larger so as to allow the spring 94 to push the roller 92 with the needed force even in areas where the distance L is larger. However, in this case, the spring 94 pushes the roller 92 with a relatively strong force in areas where the distance L is shorter, leading to a heavy load on the spring 94 due to a reaction force. This may fatigue the springs 94 in these areas to shorten the life of the one-way clutch.

Thus, the variation in the distance L of the spring area needs to be reduced. To achieve this, a configuration has been proposed which allows the cage 93 to be fixed in position to the inner ring 90, on which the cam surfaces 95 are formed. Specifically, as depicted in FIG. 5, protruding portions 98 are formed on an inner periphery of an annular portion 97 of the cage 93, and recessed portions 99 are formed on an outer periphery of the inner ring 90. The protruding portions 98 are fitted in the respective recessed portions 99 to allow the cage 93 to be positioned with respect to the inner ring 90 and fixed thereto. Each of the recessed portions 99 is formed in an area different from the area of the cam surface 95, which is recessed so as to allow the roller 92 to engage with the cam surface 95. A base 94a of each spring 94 is attached to the corresponding cage bar 96 of the cage 93. A tip 94b of each spring 94 protrudes from the cage bar 96 toward the corresponding roller 92. Thus, the spring 94 can elastically push the roller 92.

As described above, besides the recess-shaped cam surfaces 95, the recessed portions 99 are formed on the outer periphery of the inner ring 90 so that the protruding portions 98 of the cage 93 allowing suppression of a variation in the distance L of the spring area are fitted in the respective recessed portions 99. However, each cam surface 95 is formed in an area that is different from the area of the corresponding recessed portion 99 and that is located away from the recessed portion 99 in the circumferential direction. Thus, in addition to a dimensional error in the cam surface 95 itself and a dimensional error in the recessed portion 99 itself, a dimensional error concerning circumferential arrangement of the cam surfaces 95 and the recessed portions 99 is likely to occur. Consequently, even when the protruding portions 98 of the cage 93 are fitted in the respective recessed portions 99 to allow the cage 93 to be positioned by the inner ring 11, the distance L of the spring area varies within the one-way clutch as in the above-described case. As a result, a heavy load is imposed on some of the springs 94, making the one-way clutch less durable (shortening the life of the one-way clutch). In particular, when the one-way clutch is provided in an alternator, the pulley (outer ring 91) rotates at high speed and involves significant and frequent rotational fluctuations, making the springs 94 likely to fatigue.

SUMMARY OF THE INVENTION

An object of the invention is to suppress, in a one-way clutch, a variation in the distance between each engagement element (roller) and a corresponding spring attachment position on a cage (in other words, the distance of the spring area) to make springs more durable.

A one-way clutch in an aspect of the invention includes an inner ring, an outer ring, a plurality of engagement elements provided between the inner ring and the outer ring, an annular cage in which a plurality of pockets is formed at intervals in a circumferential direction so that the engagement elements are each held in a corresponding one of the pockets, and springs each attached to a part of the cage to bias a corresponding one of the engagement elements in the pockets in one direction along the circumferential direction. The cage has a plurality of protruding portions fitted in the inner ring so that the cage is not allowed to rotate with respect to the inner ring. The inner ring has, on its outer periphery, a plurality of recessed portions each including a cam surface that allows a corresponding one of the engagement elements to be engaged between the cam surface and an inner peripheral surface of the outer ring. Each of the recessed portions further has a fitting surface that is formed as a surface continuous with the cam surface of the recessed portion and on which a corresponding one of the protruding portions is closely fitted.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
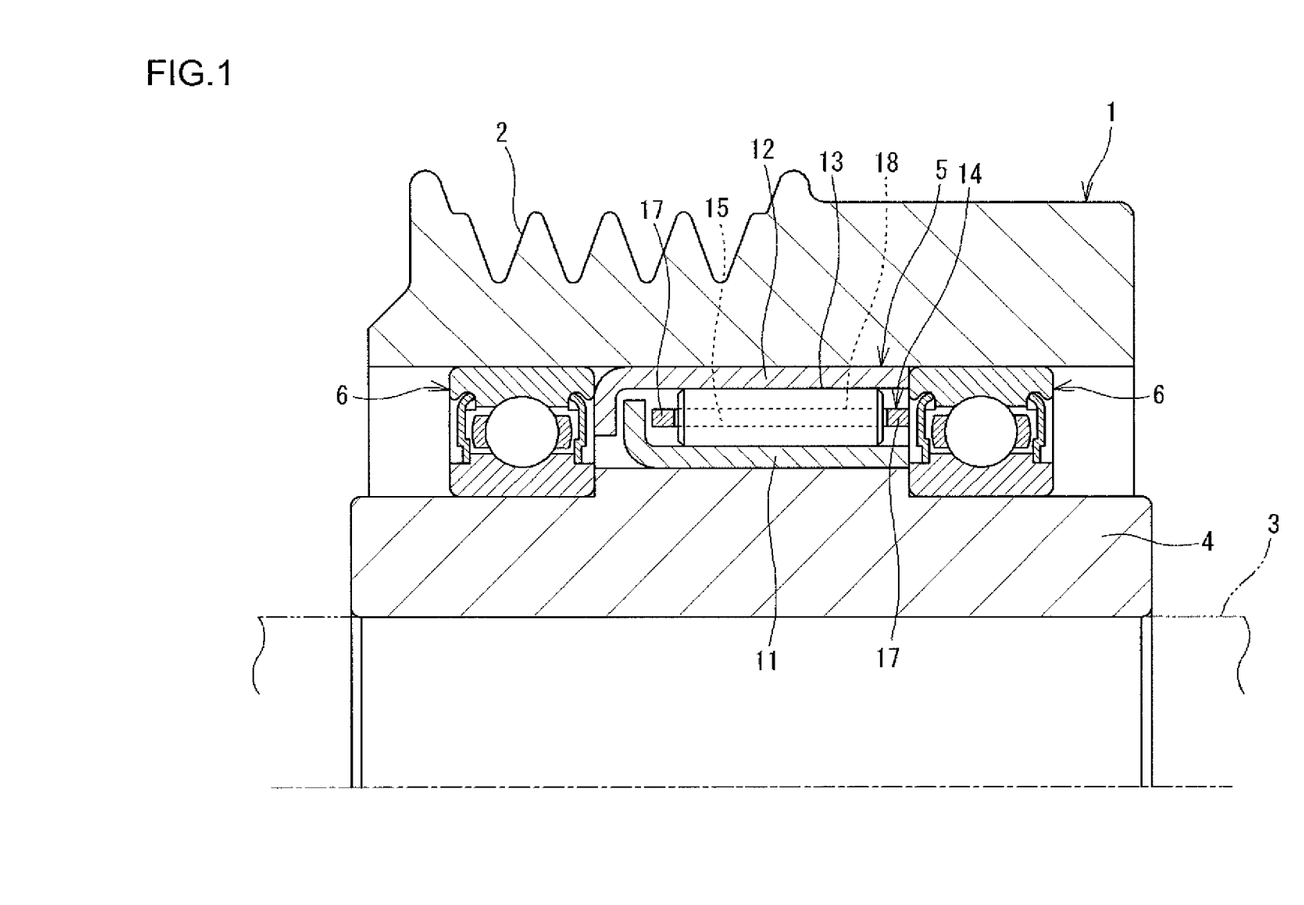
FIG. 1 is a sectional view depicting an example of a pulley apparatus including a one-way clutch.

An embodiment of the invention will be described below based on the drawings. FIG. 1 is a sectional view depicting an example of a pulley apparatus including a one-way clutch. A pulley apparatus 1 depicted in FIG. 1 is used for an alternator mounted in an automobile. Although not depicted in the drawings, rotation of a crankshaft of an engine of the automobile is transmitted to the alternator via an endless belt. Thus, the pulley apparatus depicted in FIG. 1 includes a pulley portion 2 around which the endless belt is wound.

The pulley apparatus 1 includes the pulley portion 2, a sleeve 4, a one-way clutch 5, and a pair of rolling bearings 6, 6. The sleeve 4 rotates integrally with a rotating shaft 3. The one-way clutch 5 and the rolling bearings 6, 6 are provided between the pulley portion 2 and the sleeve 4. The pulley apparatus 1 is of a type having a built-in one-way clutch. The pulley portion 2 is a cylindrical member around the outer periphery of which the endless belt is wound. The sleeve 4 is a cylindrical member externally fitted over and fixed to the rotating shaft 3. The one-way clutch 5 is provided in a central portion of an annular space between the pulley portion 2 and the sleeve 4 in an axial direction. The rolling bearings (in the present embodiment, ball bearings) 6, 6 are provided on the opposite sides of the one-way clutch 5 in the axial direction.

The one-way clutch 5 includes an inner ring 11, an outer ring 12, a plurality of rollers (engagement elements) 13, an annular cage 14, and springs 15. The inner ring 11 rotates integrally with the sleeve 4. The outer ring 12 is positioned outward of the inner ring 11 in a radial direction so as to rotate integrally with the pulley portion 2. The rollers 13 are provided between the inner ring 11 and the outer ring 12. The cage 14 holds the rollers 13. The springs 15 bias the rollers 13. The inner ring 11 and the outer ring 12 are cylindrical members. The plurality of rollers 13, the cage 14, and the plurality of (the same number as that of the rollers 13) springs 15 are provided between the inner ring 11 and the outer ring 12.

Figure 2:
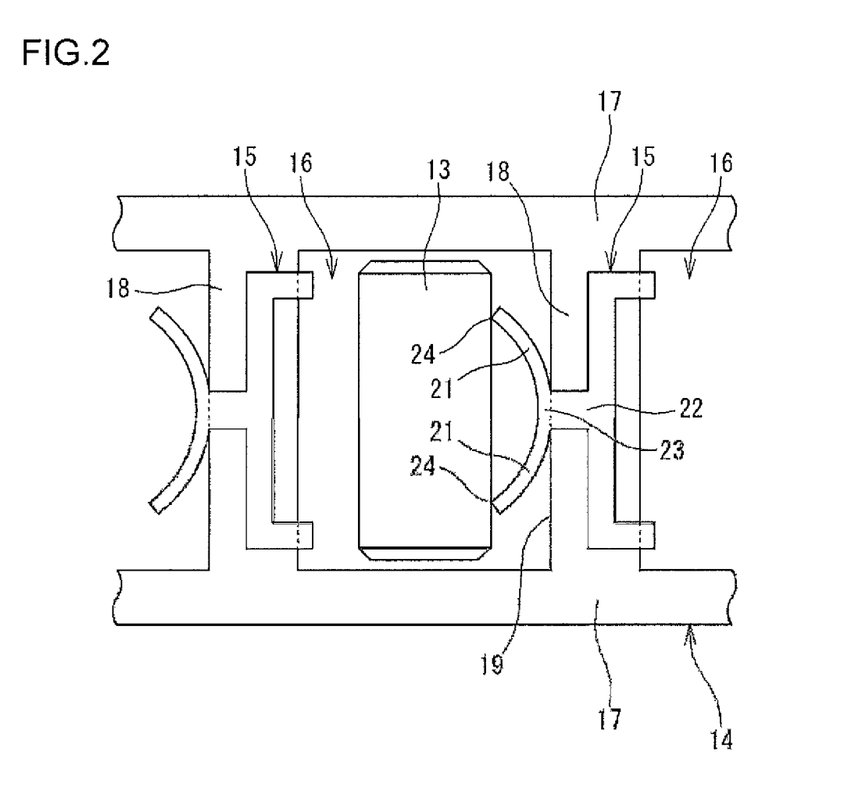
FIG. 2 is a diagram illustrating rollers, springs, and a cage as viewed from outside in a radial direction.

FIG. 2 is a diagram illustrating the roller 13, the springs 15, and the cage 14 as viewed from outside in the radial direction. The cage 14 in the present embodiment has a pair of annular portions 17, 17 and a plurality of cage bars 18. The annular portions 17, 17 are provided on the opposite sides of each roller 13 in the axial direction. The cage bars 18 are provided at intervals in the circumferential direction to couple the annular portions 17, 17 together. Pockets 16 of the cage 14 are each formed between the annular portions 17, 17 and between the adjacent cage bars 18, 18 in the circumferential direction. One roller 13 is housed in each of the pockets 16. Consequently, the cage 14 is configured such that the pockets 16 each holding the roller 13 are provided at intervals (regular intervals) in the circumferential direction.

Figure 3:
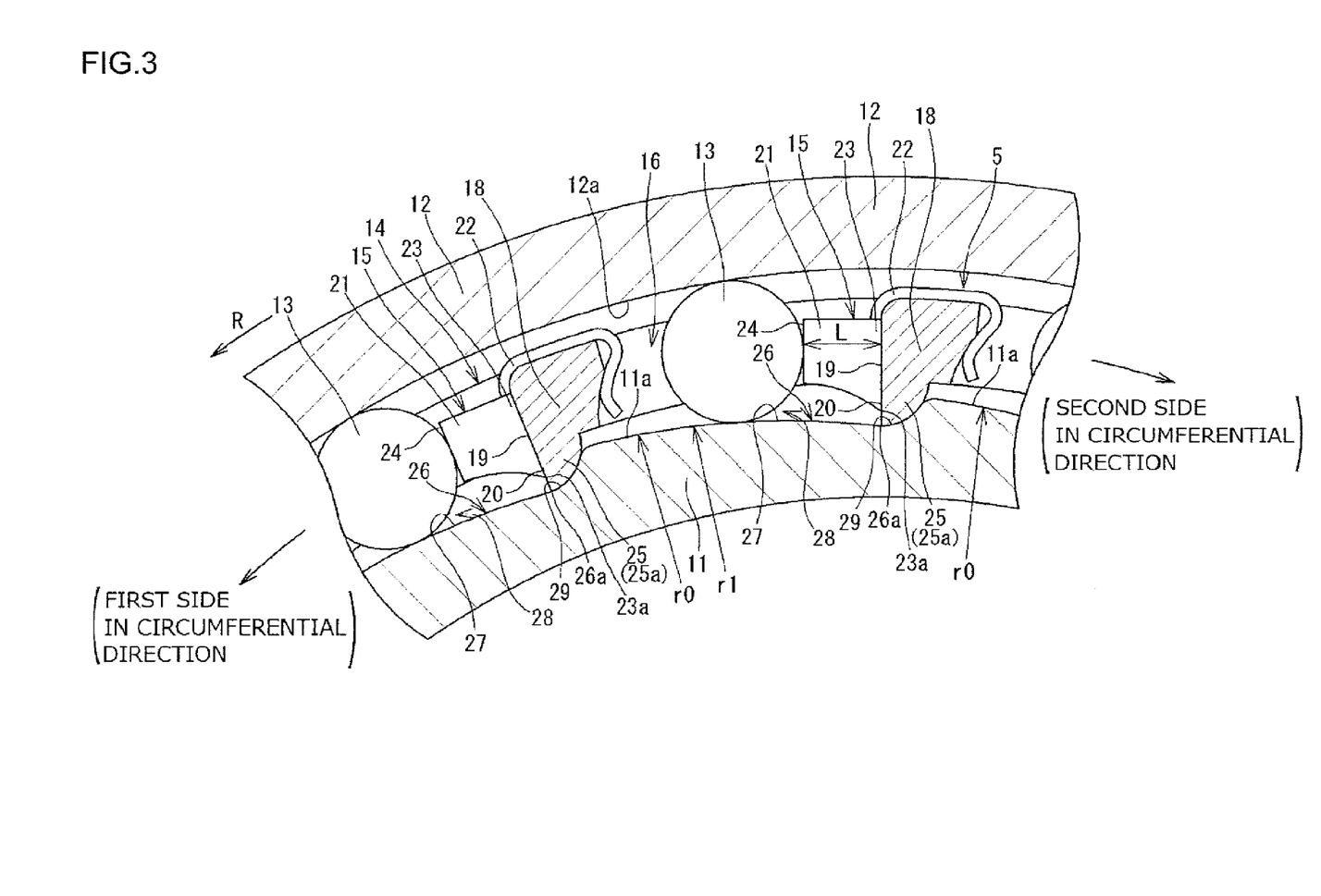
FIG. 3 is a sectional view of a part of the one-way clutch as viewed in an axial direction.

FIG. 3 is a sectional view of a part of the one-way clutch 5 as seen in the axial direction. In FIG. 2 and FIG. 3, each of the springs 15 has a pair of leaf spring piece portions 21 and an attachment portion 22. The leaf spring piece portions 21 come into contact with the corresponding roller 13 and are elastically deformed to push the roller 13. The attachment portion 22 attaches the leaf spring piece portions 21 to a part of the cage 14. The leaf spring piece portions 21, 21 are each a leaf spring extending from the attachment portion 22. The attachment portion 22 is fitted in and fixed to the corresponding cage bar 18. Consequently, the spring 15 is attached to a part (cage bar 18) of the cage 14 to allow the roller 13 in the corresponding pocket 16 to be biased toward a first side (in FIG. 2 and FIG. 3, leftward) in the circumferential direction.

As depicted in FIG. 2, the leaf spring piece portions 21, 21 are also shaped to extend from the attachment portion 22 toward the opposite sides in the axial direction. A base 23 of each leaf spring piece portion 21 is in surface contact with a side surface 19 of the corresponding cage bar 18 as depicted in FIG. 2 and FIG. 3. The side surface 19 is an attachment position (attachment surface) of the spring 15. The leaf spring piece portions 21 extend from the attachment position on the cage 14 toward the corresponding roller 13. While being elastically deformed to push the roller 13, the leaf spring piece portions 21 exert a reaction force on the side surface 19. The leaf spring piece portions 21 are in surface contact with the side surface 19, and the cage bar 18 can receive the reaction force of the leaf spring piece portions 21. In other words, the side surface 19 of the cage bar 18 serves as a seat surface (first seat surface) that can receive the reaction force of the spring 15 (leaf spring piece portions 21).

Figure 4:
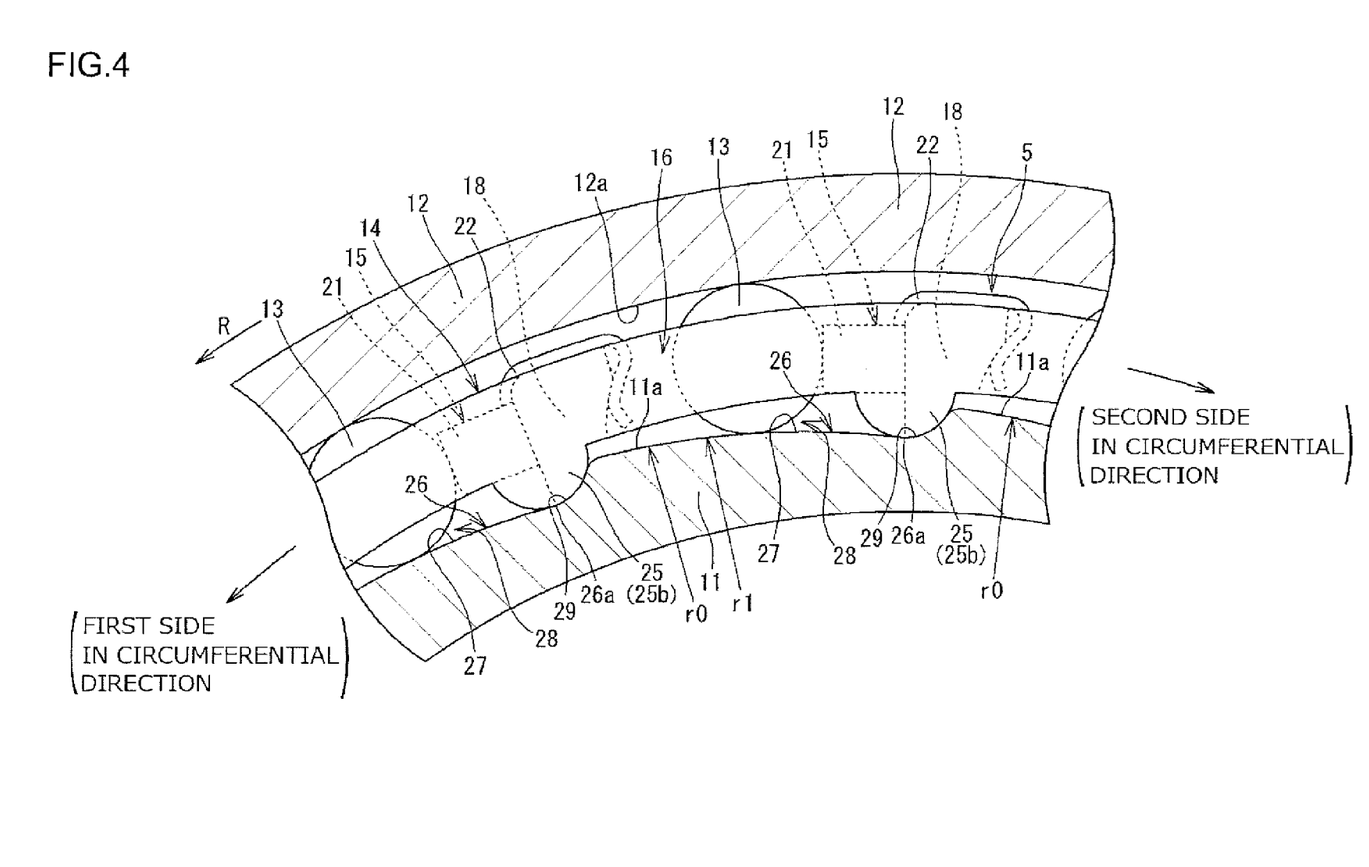
FIG. 4 is a diagram of the cage and a periphery thereof as viewed in the axial direction.

As depicted in FIG. 3, the cage 14 has a plurality of protruding portions 25 on an inner periphery of the cage 14. The protruding portions 25 protrude inward in the radial direction and are provided at regular intervals along the circumferential direction. The number of the protruding portions 25 is the same as the number of the cage bars 18 and also as the number of the rollers 13. FIG. 4 is a diagram of the cage 14 and a periphery thereof as viewed in the axial direction. As depicted in FIG. 3, protruding portions (first protruding portions) 25a are each provided on an inner periphery of the corresponding cage bar 18. As depicted in FIG. 4, protruding portions (second protruding portions) 25b are each provided on an inner periphery of the corresponding one of the annular portions 17, 17 located on the opposite sides in the axial direction. The protruding portion 25a (see FIG. 3) on the inner periphery of each of the cage bars 18 is continuous with the protruding portion 25b (see FIG. 4) on the inner periphery of the corresponding annular portion 17. The protruding portions 25a, 25b form the protruding portion 25 that is elongate in the axial direction. The protruding portions 25 are each fitted in a part (fitting surface 29) of a recessed portion 26 of the inner ring 11 described below so that the cage 14 is not allowed to rotate in both directions along the circumferential direction with respect to the inner ring 11. The functions of the protruding portions 25 will further be described below.

The protruding portion 25a (see FIG. 3) on the inner periphery of each of the cage bars 18 is shaped like a quarter circle in section and has a side surface 20 facing the corresponding roller 13. A large part of the base 23 of the leaf spring piece portions 21 is in surface contact with the side surface (first seat surface) 19 of the corresponding cage bar 18. The remaining part of the base 23 of the leaf spring piece portions 21 is in surface contact with the side surface 20 of the protruding portion 25a. Consequently, the protruding portion 25a can also receive the reaction force of the leaf spring piece portions 21 and transmit the reaction force to the inner ring 11. In other words, the side surface 20 of the protruding portion 25a serves as a seat surface (second seat surface) that can receive the reaction force of the spring 15 (leaf spring piece portions 21).

As depicted in FIG. 3, the inner ring 11 has a plurality of recessed portions 26 on an outer periphery of the inner ring 11. The recessed portions 26 are recessed grooves that are recessed inward of an outer peripheral surface 11a of the inner ring 11 in the radial direction and that are arranged at regular intervals along the circumferential direction. The number of the recessed portions 26 is the same as the number of the rollers 13. In each of the recessed portions 26, a cam surface 27 is formed which has a radius r1 increasing toward the first side (in FIG. 3, leftward) in the circumferential direction. The cam surface 27 is configured such that the corresponding roller 13 is engaged between the cam surface 27 and an inner peripheral surface 12a of the outer ring 12. A wedge-like space 28 is formed between the cam surface 27 and the inner peripheral surface 12a of the outer ring 12 (a part of the inner peripheral surface 12a that faces the cam surface 27). The roller 13 can be trapped in the wedge-like space 28 for engagement. The spring 15 is configured to push the corresponding roller 13 in a direction in which the wedge-like space 28 is narrowed.

Bearing steel or carbon steel is adopted as a material for the inner ring 11, the outer ring 12, and the rollers 13. Spring steel is adopted as a material for the springs 15. The cage 14 is formed of resin, allowing the protruding portions 25 and the like to be easily formed by injection molding using a mold.

The above-described configuration allows the one-way clutch 5 to function as follows. When, in FIG. 1, the rotational speed of the outer ring 12, located closer to the pulley portion 2, is higher than the rotational speed of the inner ring 11 and the outer ring 12 rotates relative to the inner ring 11, then in FIG. 3, the rollers 13 are engaged between the inner ring 11 (cam surface 27) and the outer ring 12. This makes the inner ring 11 and the outer ring 12 unable to rotate relative to each other (lock state). In FIG. 3, a rotating direction of the outer ring 12 is depicted by arrow R. When the rotational speed of the outer ring 12 is lower than the rotational speed of the inner ring 11, the rollers 13 are disengaged from the inner ring 11 and the outer ring 12. As a result, the inner ring 11 and the outer ring 12 rotate relative to each other (free state). As described above, the one-way clutch 5 is switched between the lock state and the free state, allowing rotational fluctuations of the endless belt (a crank shaft of an engine) to be absorbed.

In FIG. 3 and FIG. 4, the recessed portions 26 with which the rollers 13 as described above engage also have a function to cooperate with the protruding portions 25 of the cage 14 in preventing the cage 14 from rotating in both directions along the circumferential direction (in other words, positioning the cage 14 in the circumferential direction). In other words, the cage 14 and the inner ring 11 are not allowed to rotate relative to each other when assembled together by press-fitting the protruding portions 25 of the cage 14 into the respective recessed portions 26 (a part of each recessed portion 26) of the inner ring 11. To achieve this, the fitting surface 29 is formed on each recessed portion 26 so that the corresponding protruding portion 25 can be closely fitted on the fitting surface 29. Each recessed portion 26 has the cam surface 27 and the fitting surface 29 juxtaposed in the circumferential direction. In the recessed portion 26, the cam surface 27 and the fitting surface 29 form one smooth recessed curved surface. A part of the recessed portion 26 functions as the cam surface 27, while the remaining part functions as the fitting surface 29. As described above, the recessed portion 26 has the cam surface 27 with which the corresponding roller 13 engages and also has the fitting surface 29 that is formed to be continuous with the cam surface 27 in the recessed portion 26 and onto which the corresponding protruding portion 25 of the cage 14 is closely fitted.

As depicted in FIG. 3 (and FIG. 4), the recessed portion 26 is recessed radially inward of a portion of the outer peripheral surface 11a of the inner ring 11 that has a uniform radius r0 (in FIGS. 3 and 4, the surface on a second side in the circumferential direction). The portion that is recessed inward in the radial direction is shaped like a quarter circle. The portion that is shaped like a quarter circle serves as the fitting surface 29. The radius r1 gradually increases from a bottom 26a of the portion shaped like a quarter circle toward the first side (in FIG. 3, leftward) in the circumferential direction, and this portion continues with the portion of the outer peripheral surface 11a that has a uniform radius r0 (the surface on the first side in the circumferential direction). The portion having a gradually increasing radius r1 serves as the cam surface 27.

The protruding portions 25 of the cage 14 will be described. The protruding portion 25a (see FIG. 3) located on an inner side of each cage bar 18 in the radial direction is shaped like a quarter circle in section. The radius of the protruding portion 25a is set slightly larger than the radius of each fitting surface 29. The protruding portion 25b (see FIG. 4) located inward of each annular portion 17 in the radial direction is shaped like a half circle in section. The radius of the protruding portion 25b is set slightly larger than the radius of the fitting surface 29. Consequently, each of the protruding portions 25a, 25b can closely contact the corresponding fitting surface 29. The protruding portions 25a, 25b are also in contact with the bottom 26a, which is deepest in the recessed portion 26. As a result, the cage 14 is precluded from being displaced (rotating) in the first and second directions along the circumferential direction.

In the one-way clutch 5 configured as described above, the protruding portions 25 of the cage 14 are closely fitted on the respective fitting surfaces 29 of the inner ring 11. Consequently, the cage 14 is not allowed to rotate in both directions along the circumferential direction with respect to the inner ring 11, and the cam surfaces 27 of the inner ring 11 are positioned relative to the cage 14. The cam surface 27 and the fitting surface 29 are formed on the common recessed portion 26. Thus, dimensional errors are less likely to occur which concern the arrangement of the cam surface 27 and the fitting surface 29 in the circumferential direction. This enables minimization of errors concerning the circumferential relative position between the cage 14, positioned via the fitting surfaces 29, and each cam surface 27 when the one-way clutch 5 is assembled. This reduces a variation in the distance L between each roller 13, which is engaged between the corresponding cam surface 27 and the outer ring 12, and the attachment position on the cage 14 where the corresponding spring 15 is attached (attachment surface: the side surface 19 of the corresponding cage bar 18). As a result, when the circumferential length of each of the springs 15 (leaf spring piece portions 21) is set to a predetermined value, the springs 15 (leaf spring piece portions 21) pushing the respective rollers 13 engaged with the corresponding cam surfaces 27 are deformed by a uniform amount. This eliminates a variation in the amount of elastic deformation among the springs 15. Consequently, a situation can be prevented where a heavier load is imposed on some of the springs 15 as in a related technique, enabling all of the springs 15 in one one-way clutch 5 to be made more durable.

Even when each recessed portion 26 is provided with the corresponding cam surface 27 and further with a contact surface that can be contacted by the corresponding protruding portion 25 of the cage 14, if the contact surface and the protruding portion 25 are not closely fitted together (the case of another related technique), dimensional errors are less likely to occur which concern the arrangement of the cam surface 27 and the contact surface in the circumferential direction. However, in this case, the cage 14 can be slightly displaced in the circumferential direction with respect to the inner ring 11. Thus, the distance L of the spring area varies significantly. As a result, a heavier load is imposed on the springs 15 provided in the spring areas with a reduced distance L, making these springs 15 fatigued.

The shape of the springs 15 in the present embodiment will further be described. As depicted in FIG. 2 and FIG. 3, the leaf spring piece portions 21 contacting each roller 13 have a leaf spring shape with a uniform thickness. In other words, the leaf spring piece portions 21 have a rectangular section. The rectangular section is elongate in the radial direction of the one-way clutch 5. As depicted in FIG. 3, the leaf spring piece portions 21 have a radial dimension increasing from the tip 24 toward the base 23. In other words, the rectangular section of the leaf spring piece portions 21 increases in size toward the base 23. More specifically, at least a radially inner end 23a of the base 23 of the leaf spring piece portions 21 corresponding to the attachment position (the side surface 19 of the cage bar 18) is positioned radially inward of the portion of the outer peripheral surface 11a in which the inner ring 11 has a uniform radius r0. The radially inner end 23a is positioned radially outward of a virtual circle that passes through the bottom 26a, the deepest part of the recessed portion 26, and that is centered around a center line of the one-way clutch 5.

When the spring 15 pushing the roller 13 has the leaf spring piece portions 21 as depicted in FIG. 2 and FIG. 3, the base 23 disadvantageously has an inappropriate strength. However, in the present embodiment, the radially inner end 23a of the base 23 is positioned inward of the outer peripheral surface 11a of the inner ring 11 in the radial direction, the base 23 of the leaf spring piece portions 21 has an increased radial dimension. This increases a section modulus for the spring 15 to make the spring 15 more durable.

The springs 15 are each attached to the corresponding cage bar 18 of the cage 14. The protruding portions 25a of the cage 14 are provided inward of the respective cage bars 18 in the radial direction. Thus, the reaction force exerted on each spring 15 by the corresponding roller 13 is borne by the corresponding cage bar 18, and the reaction force (a portion of the reaction force) can be transmitted from the cage bar 18 to the inner ring 11 via the corresponding protruding portion 25a (and the corresponding fitting surface 29). This enables the cage bar 18 to be prevented from being deflected by the reaction force of the spring 15, allowing the spring 15 to apply a desired bias force to the roller 13.

In the cage 14 in the present embodiment, each of the cage bars 18 has the side surface 19 facing the corresponding roller 13 as depicted in FIG. 3. The side surface 19 serves as a first seat surface that is contacted by the base 23 of the corresponding leaf spring piece portions 21 and that can receive the reaction force of the leaf spring piece portions 21 as described above. The protruding portion 25a radially inward of the cage bar 18 is continuous with the first seat surface (the side surface 19 of the cage bar 18) and has the side surface 20 that faces the roller 13. The side surface 20 serves as a second seat surface that is contacted by a part of the base 23 of the leaf spring piece portions 21 and that can receive the reaction force of the leaf spring piece portions 21. The side surface 20 is positioned on an extension surface extending inward of the side surface 19 of the cage bar 18 in the radial direction. The side surfaces 19, 20 form one surface (flat surface).

The first seat surface (side surface 19) and the second seat surface (side surface 20) are configured such that the seat surface (side surface 19) that bears the leaf spring piece portions 21 can be enlarged in the radial direction (by the side surface 20). Thus, the spring 15 (leaf spring piece portions 21) can be stably supported and made much more durable.

As described above, the one-way clutch 5 (see FIG. 1) in the embodiment is a roller clutch provided in an alternator mounted in an automobile. In the one-way clutch (roller clutch) in the alternator, the pulley portion 2 (outer ring 12) rotates at high speed and involves significant and frequent rotational fluctuations, making the springs 15 likely to fatigue. However, the configuration of the present embodiment allows the springs 15 to be made more durable. As a result, the life of the one-way clutch 5 and further of the alternator can be extended.

The embodiment disclosed above is illustrative in every way and is not restrictive. In other words, the one-way clutch in the invention is not limited to the illustrated embodiment but may be in any other embodiment within the scope of the invention. For example, the engagement elements each engaged between the corresponding cam surface 27 and the outer ring 12 may be balls instead of the rollers 13. Also in this case, the configuration of the invention enables the springs biasing the balls to be made more durable. Besides the alternator, the one-way clutch 5 may be applied to any other type of rotating equipment.

The one-way clutch in the invention reduces a variation in the distance between: each of the engagement elements engaged between the corresponding cam surface of the inner ring and the outer ring; and the attachment position on the cage to which the spring is attached. This eliminates a variation in the amount of elastic deformation of the spring to enable the spring to be made more durable.

What is claimed is:

1. A one-way clutch comprising:
    an inner ring;
    an outer ring;
    a plurality of engagement elements provided between the inner ring and the outer ring;
    an annular cage in which a plurality of pockets is formed at intervals in a circumferential direction so that the engagement elements are each held in a corresponding one of the pockets; and
    a plurality of springs that are each attached to a part of the cage to bias a corresponding one of the engagement elements in the pockets in one direction along the circumferential direction,
    wherein:
        the cage includes a plurality of protruding portions that are each fitted in the inner ring so that the cage is not able to rotate with respect to the inner ring,
            a cross-section of each protruding portion, on an axially inner side of the cage, forming a quarter circle shape, and
            a cross-section of each protruding portion, on an axially outer side of the cage, forming a half circle shape,
        an outer periphery of the inner ring includes a plurality of recessed portions that each include a cam surface and a fitting surface,
        a corresponding one of the engagement elements being engaged between the cam surface and an inner peripheral surface of the outer ring, and
        the fitting surface being formed as a surface that is continuous with the cam surface and on which a corresponding one of the protruding portions is closely fitted.

2. The one-way clutch according to claim 1, wherein:
    each of the springs includes a leaf spring piece portion extending from an attachment position on the cage and includes a rectangular section that is elongate in a radial direction, and
    an inner end of a base of the leaf spring piece portion, which corresponds to the attachment position, is positioned between the inner ring and the outer ring.

3. The one-way clutch according to claim 2, wherein the cage includes:
    a pair of annular portions provided on opposite sides of each of the engagement elements in an axial direction; and
    a plurality of cage bars provided at intervals in the circumferential direction, the cage bars coupling the annular portions together,
    wherein:
        each of the springs is attached to a corresponding one of the cage bars, and
        each of the protruding portions is provided radially inward of the corresponding cage bar.

4. The one-way clutch according to claim 3, wherein:
    each of the cage bars has a first seat surface that faces the corresponding engagement element and is contacted by the base of a corresponding one of the springs to receive a reaction force of the spring, and
    each of the protruding portions has a second seat surface that is continuous with the first seat surface and that is contacted by the base of the corresponding spring to receive the reaction force of the spring.

5. The one-way clutch according to claim 1, wherein the cage includes:
    a pair of annular portions provided on opposite sides of each of the engagement elements in an axial direction; and
    a plurality of cage bars provided at intervals in the circumferential direction, the cage bars coupling the annular portions together,
    wherein:
        each of the springs is attached to a corresponding one of the cage bars, and
        each of the protruding portions is provided radially inward of the corresponding cage bar.

6. The one-way clutch according to claim 5, wherein:
    each of the cage bars has a first seat surface that faces the corresponding engagement element and is contacted by the base of a corresponding one of the springs to receive a reaction force of the spring, and
    each of the protruding portions has a second seat surface that is continuous with the first seat surface and that is contacted by the base of the corresponding spring to receive the reaction force of the spring.

* * * * *